Inventor:
Hermann E.F.C. Lingenbrink
by his Attorneys
Howson & Howson

May 20, 1952  H. E. F. C. LINGENBRINK  2,597,113
PHONOGRAPH APPARATUS
Filed May 8, 1946  8 Sheets-Sheet 4

Inventor:
Hermann E.F.C. Lingenbrink
by his Attorneys
Howson & Howson

May 20, 1952 H. E. F. C. LINGENBRINK 2,597,113
PHONOGRAPH APPARATUS
Filed May 8, 1946 8 Sheets-Sheet 7

May 20, 1952     H. E. F. C. LINGENBRINK     2,597,113
PHONOGRAPH APPARATUS Filed May 8, 1946                            8 Sheets—Sheet 8

Inventor:—
Herman E. F. C. Lingenbrink
by his Attorneys
Howson & Howson

Patented May 20, 1952

2,597,113

UNITED STATES PATENT OFFICE 2,597,113

PHONOGRAPH APPARATUS

Hermann E. F. C. Lingenbrink, Hilltown, Pa., assignor, by mesne assignments, to Philco Corporation, Philadelphia, Pa., a corporation of Pennsylvania Application May 8, 1946, Serial No. 668,195

11 Claims. (Cl. 274—15)

This invention relates to phonographs, and more particularly to automatic phonographs which are adapted to play a plurality of records successively. By this invention, there is provided a phonograph apparatus which embodies the novel features hereinafter set forth and which is preferably of the type having provisions for supporting a stack of records above a turntable and for feeding the records successively onto the turntable.

One object of the invention is to provide an automatic phonograph apparatus for home use which is capable of low cost production and which may be sold at a relatively low price. A phonograph apparatus constructed according to the invention may be made principally of stamped metal parts with consequent economy of manufacture of the apparatus as a whole.

Another object of the invention is to provide a phonograph apparatus which is reliable and efficient in operation.

A further object of the invention is to provide a novelly constructed phonograph apparatus which is adapted for both manual and automatic operation, and which includes provision for rejection of a record at will during automatic operation, and which is also adapted to play different sized records.

One feature of the invention comprises a novel triple lever arrangement in association with a cycling cam for actuating a tone arm moving mechanism and a record-feeding mechanism.

Another feature of the invention resides in a novel arrangement including two springs and associated connections for actuating the tone arm in response to movement of two of the above mentioned levers.

Another feature of the invention comprises the combination of a cycling cam and a novel trip arrangement for initiating the record-changing cycle either automatically or manually.

A further feature of the invention resides in the provision of novel means for indexing or properly positioning the tone arm for commencement of different sized records.

Still another feature of the invention resides in the provision of novel means for enabling the tone arm to follow a spiral lead-in groove of a record as soon as the pick-up stylus engages the marginal portion of the record, even though the tone arm supporting means is being momentarily restrained against inward movement.

A further feature of the invention comprises a novel and improved record-feeding mechanism of the push-off type.

Other objects and features of the invention will be apparent as the description proceeds.

Figure 1:
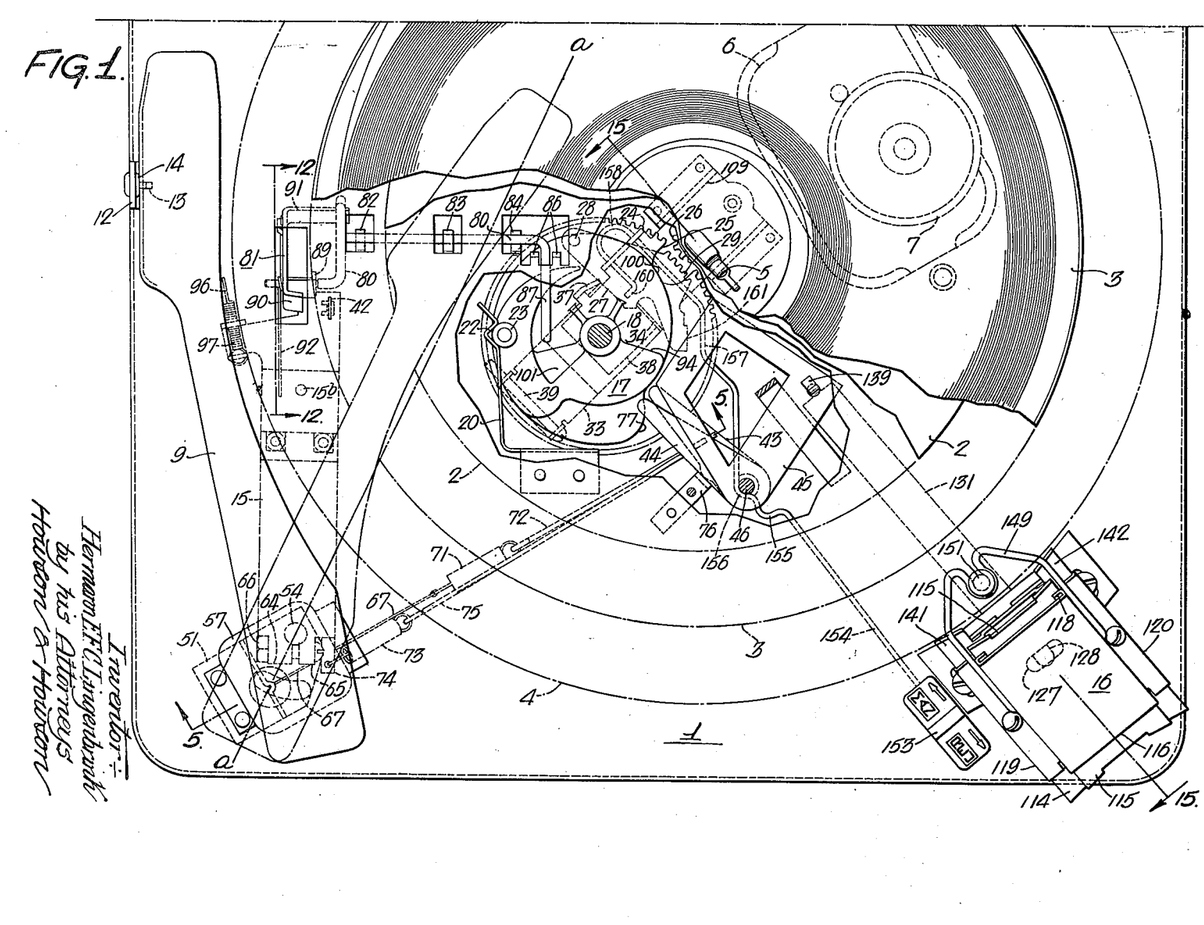
Fig. 1 is a plan view of the phonograph apparatus, with certain portions of the supporting base or panel broken away for the sake of illustration.

Referring first to Fig. 1, the phonograph apparatus illustrated comprises a horizontal supporting base or panel 1 which serves to support the various parts, as hereinafter described. A turntable 2 is rotatably supported by the base 1 and is adapted to hold different sized records, e. g. 10″ and 12″ records, during the playing thereof. The outlines of two such records are shown at 3 and 4. As is customary, a central spindle 5 serves to center the records and retain them on the turntable. The turntable is driven by a suitable motor indicated generally at 6, preferably through a driving wheel 7 frictionally engaging a depending peripheral flange 8 on the turntable.

Figures 2, 3, 4:
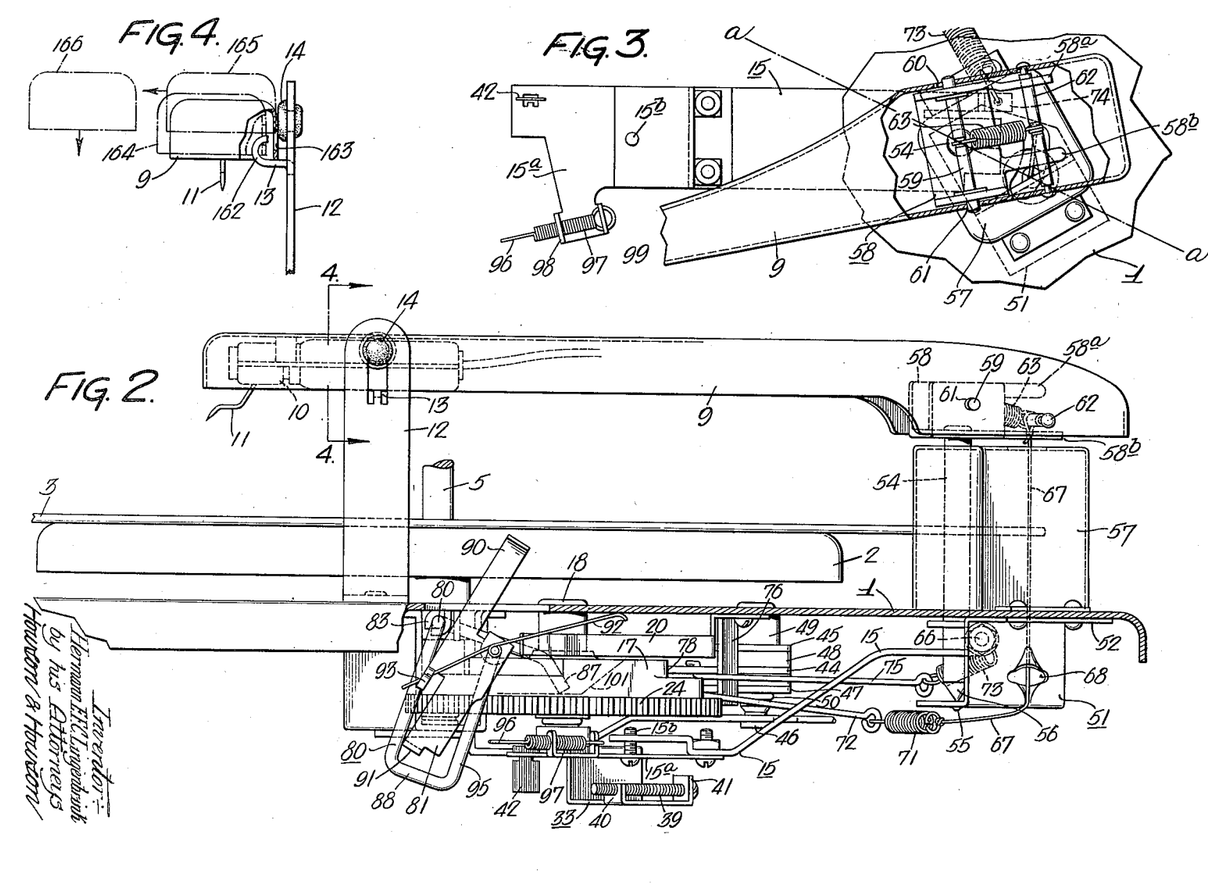
Fig. 2 is an elevational view taken from the left-hand side of Fig. 1.
Fig. 3 is a fragmentary plan view of the tone arm assembly.
Fig. 4 is a detail sectional view taken along line 4—4 of Fig. 2.

A tone arm 9 is mounted on the supporting base 1 for movement both horizontally and vertically relative to the turntable. The tone arm carries a suitable pick-up device, shown at 10 in Fig. 2, having a stylus or needle 11 which engages the records. A supporting post 12 is arranged to support the tone arm in rest position, as shown in Figs. 1 and 2. The post 12 has a bent-out portion 13 with a hook end (see Fig. 4), the purpose of which will be described later. The post also carries a cushion element 14 of rubber or the like. An arm 15, which is connected to the tone arm 9 through the mounting thereof, serves to initiate the record-changing cycle at the end of the playing of a particular record, and also helps to control the indexing or positioning of the tone arm for commencement of a succeeding record. The parts or elements by which these functions are accomplished will be described later.

As mentioned previously, the phonograph apparatus is preferably of the type in which a stack of records is supported above the turntable and the records are fed successively to the turntable. To this end, the records to be played are supported above the turntable by the central spindle 5 and by the record support and feed mechanism 16, the details of which will be described later.

If desired, automatic operation may be commenced with the tone arm in rest position, and the phonograph will commence playing a stack of records. During each record-changing cycle, the tone arm is lifted from one record and moved outwardly beyond the edge of the record, the record feed mechanism is actuated to drop another record onto the turntable, and the tone arm is then moved inward and is lowered so as to bring the stylus into engagement with the marginal portion of the new record.

The cycling cam and its operation

The operations of the various parts during the record-changing cycle are effected and controlled by a cycling cam 17 which is normally stationary and which makes a single complete revolution during the record-changing cycle. The cam is rotatably mounted on a stud 18 (Figs. 8 and 9) which depends from the supporting panel 1, the cam being held on the stud by a split ring 19 (Fig. 7) which seats in a groove provided in the stud. The cam is indexed in its normal stationary position, as shown, by a spring detent member 20 (Fig. 8) carried by a supporting bracket 21 secured to the supporting panel. The end portion of the spring detent member 20 is bent, as at 22, and cooperates with a roller 23 on the cam 17 to normally restrain the cam against movement. The cam is provided with gear teeth 24 but is recessed or cut away at 25 so as to be normally disengaged from a driving pinion 26. The latter is continuously driven from the turntable in a manner to be described later.

Figure 7:
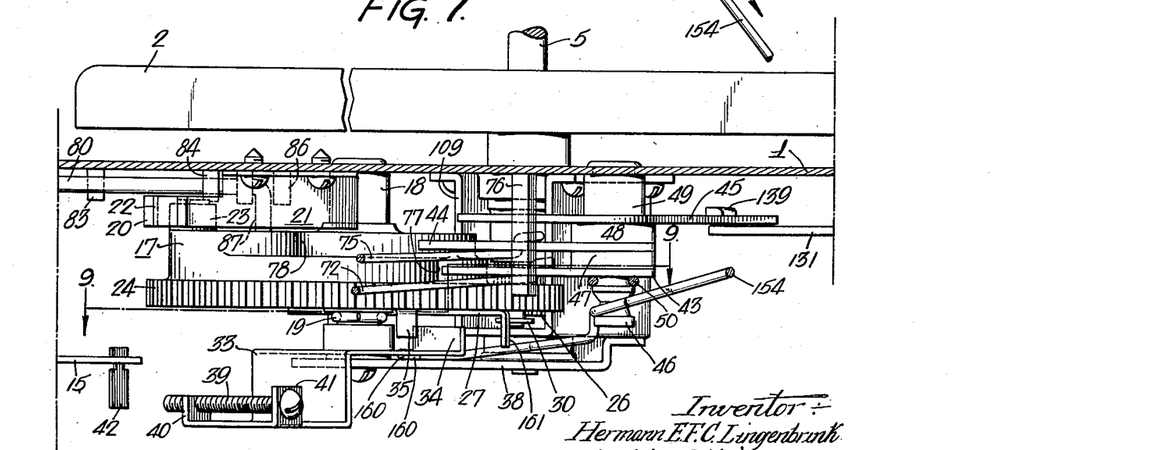
Fig. 7 is an elevational view of the cycling cam.

A member 27 (Fig. 9) is pivotally mounted on the cam 17 at 28 and has gear teeth 29 which are adapted to complete the cam gear and to mesh with the teeth of pinion 26 to initiate rotation of the cam. A pin 30 lends support to member 27 and also limits the outward movement thereof. The member 27 is urged toward operative position by a spring 31 supported by a pin 32 on the cam. However, member 27 is normally maintained in inoperative position by a latch member 33 which is rotatably mounted on stud 18 below the cam 17, as shown in Fig. 7. The latch member 33 has a turned-up lug 34, and member 27 has a cooperating turned-down lug 35 which is normally engaged by lug 34. The latch member 33 is normally in latching position against a stop lug 37 but is rotatable clockwise to release member 27. Excessive movement of the latch member is prevented by the lug 37 which is turned up from a plate 38 underlying said member.

Figures 9, 10:
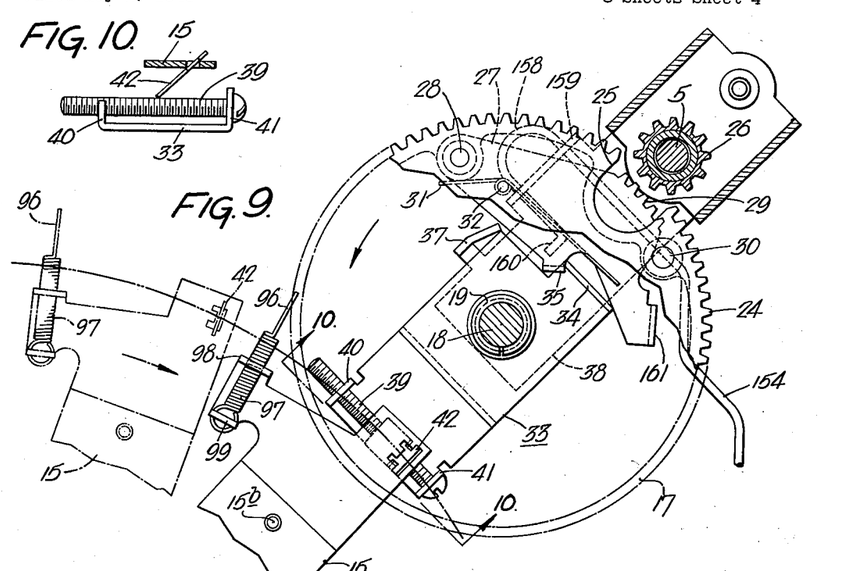
Fig. 9 is a view taken along line 9—9 of Fig. 7.
Fig. 10 is a detail view taken along line 10—10 of Fig. 9.

In order to trip the latch member 33, there is provided thereon a screw 39 which is fixedly mounted on the latch member between turned-up lugs 40 and 41. On the arm 15, there is provided a loosely-mounted pawl 42 which moves in the direction indicated in Fig. 9 and which wipes over the threads of screw 39 as the stylus nears the end of a record, as shown in Fig. 10. When the stylus enters the eccentric terminal groove of the record, the latch member 33 is rotated clockwise, as viewed in Fig. 9, due to the oscillation of arm 15 and the engagement of the pawl 42 with the screw 39. Consequently, the member 27 is released and is permitted to move to its operative position under the influence of spring 31, thus starting the cam 17. The loose mounting of the pawl 42 prevents premature tripping due to any slight eccentricity which may be present in the sound groove of the record. Preferably, arm 15 is formed in two parts, the part 15a (Fig. 2), which carries pawl 42, being adjustable by means of screw 15b to vary the position of the pawl relative to the screw 39 and thus control the tripping action.

Figure 8:
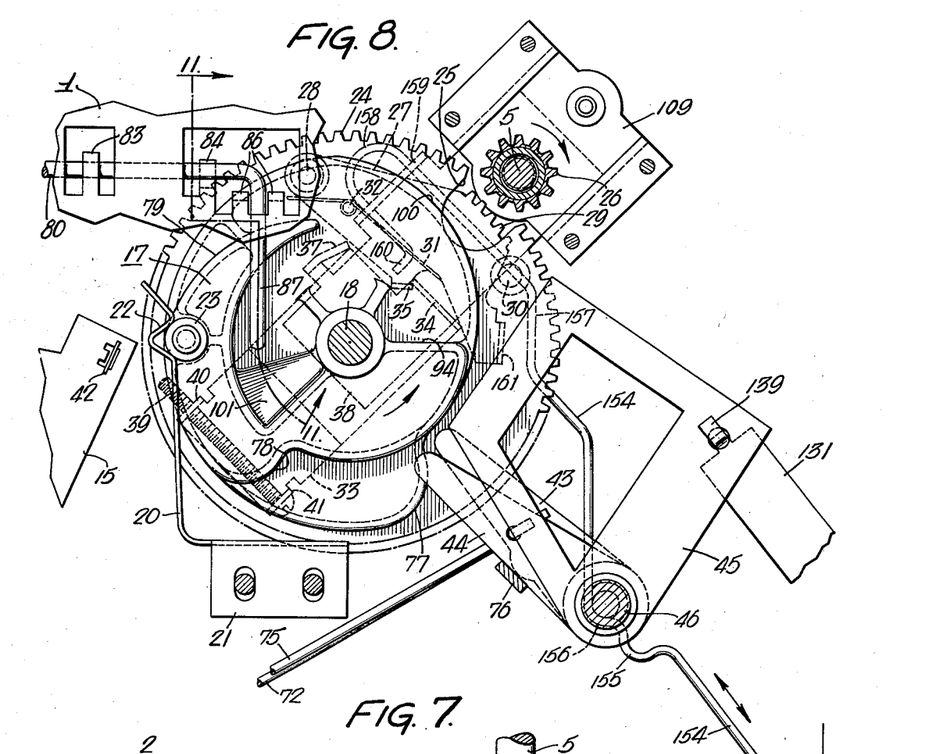
Fig. 8 is a plan view taken just below the base or supporting panel in Fig. 7.
Figures 9A, 11, 13:
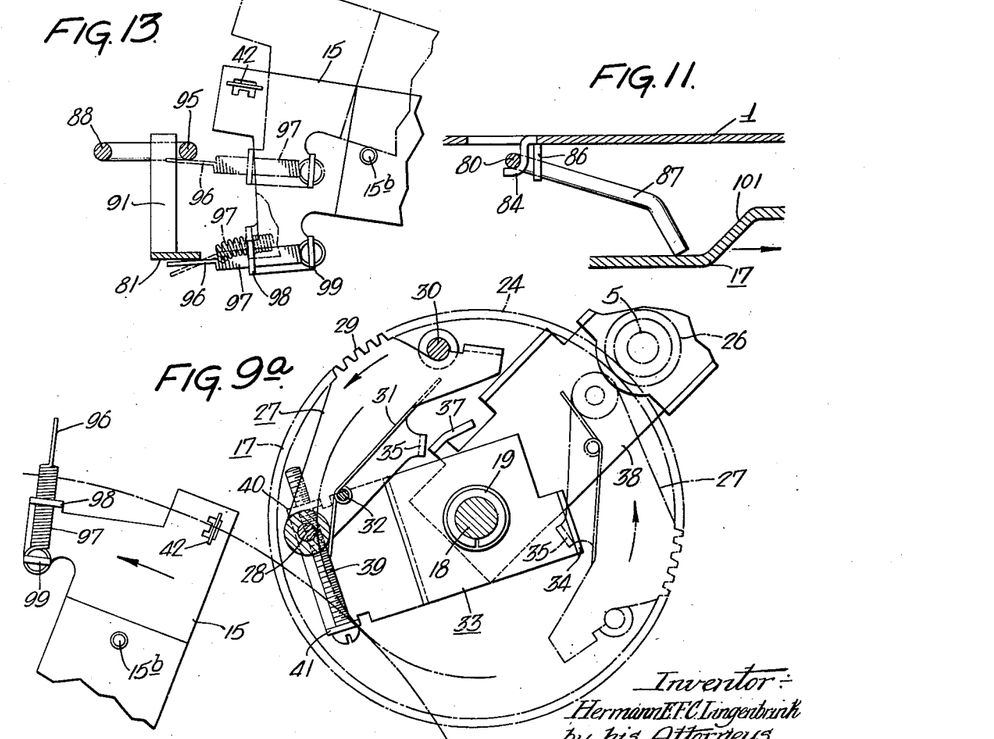
Fig. 9a is a view similar to Fig. 9, illustrating the operation of certain parts.
Fig. 11 is a fragmentary sectional view taken along line 11—11 of Fig. 8.
Fig. 13 is a view taken along line 13—13 of Fig. 12.

During the record changing cycle, the latch member 33 is deflected to a position such as shown in Fig. 9a. As the cam nears the end of a single revolution (see Fig. 9a), lug 35 engages lug 34 and moves latch member 33 counter-clockwise toward stop 37. At the same time, lug 34 cams lug 35 inwardly, thus moving member 27 to its normal inoperative position to interrupt the rotation of cam 17. At this time, roller 23 (Fig. 8) engages the bent end of the spring detent 20 and the cam 17 is stopped exactly in its normal stationary position. The cam remains stationary until the latch member 33 is again tripped at the end of the playing of the next record.

The tone arm actuating mechanism

Referring again to Fig. 1, the actuation of the tone arm 9 and the record-feeding mechanism 16 is effected, through the medium of the cycling cam 17, by three levers 43, 44 and 45 mounted on a common pivot 46. Levers 43 and 44 are in the form of arms or fingers and these levers serve to actuate the tone arm in a manner shortly to be described. Lever 45 serves to actuate the record-feeding mechanism and it functions as a bell crank lever, as hereinafter described. It is conveniently of quadrilateral form as shown. The three levers are arranged in superimposed relation on the common pivot stud 46, as may be seen in Fig. 7, lever 43 being the lowermost one, lever 45 being the uppermost one, and lever 44 being interposed between the other two. Suitable spacers 47, 48 and 49 serve to maintain the three levers in proper spaced relation while permitting free rotation of each lever on the common pivot stud. A split ring 50 seats in a groove in the stud below lever 43 and serves to maintain the levers and spacers in place.

Figures 5, 6:
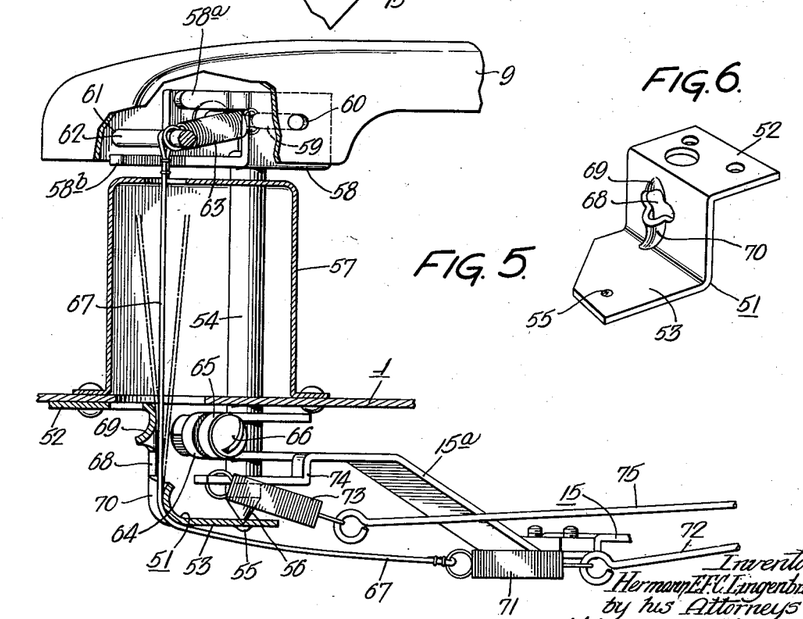
Fig. 5 is a sectional view taken along line 5—5 of Fig. 1.
Fig. 6 is a perspective view of a bracket employed in the tone arm assembly.

The tone arm mounting and the manner in which the tone arm is actuated by levers 43 and 44 will now be described. Referring particularly to Figs. 1, 2, 3, 5, and 6, there is provided a special bracket 51 which is shaped as shown in Fig. 6. The upper horizontal portion 52 of this bracket is secured to the supporting base or panel 1, as may be clearly seen in Fig. 5. The lower horizontal portion 53 of the said bracket serves as a supporting shelf for the lower end of the vertical tone arm supporting spindle 54. The shelf portion 53 is indented or recessed at 55, and the lower end of spindle 54 is tapered, as at 56, and seats in the recess 55. The spindle 54 extends upward through the supporting base or panel and through a hollow standard 57 which is secured to panel 1. Thus, the spindle 54 is rotatably supported by shelf 53 and the upper part of standard 57.

At the upper end of spindle 54, there is mounted a U-shaped bracket 58 which carries a transverse pin 59 (Fig. 3) extending through the sides of the said bracket. The tone arm is of inverted channel shape and it is rotatably mounted on the horizontal transverse pin 59. The ends of pin 59 extend through openings in the opposite sides of the tone arm, as may be seen in Fig. 3. The opening 60 in one side of the tone arm is slightly elongated longitudinally of the tone arm to permit slight movement of the tone arm about the opposite end of pin 59 as a center of rotation, the purpose of which will be described later. The opening 61 in the opposite side of the tone arm is slightly larger than pin 59 to permit slight oscillation of the tone arm while the stylus rides in the record groove. A second transverse pin 62 is fixedly carried by the tone arm rearwardly of pin 59. Each of the pins 59 and 62 is grooved midway between its ends, and a coil spring 63 is secured to and extends between the central grooved portions of the pins. This spring is under tension and it urges one end of the elongated opening 60 and one side of opening 61 against the pin 59.

The bracket 58 has extensions 58a and 58b which serve as stops cooperating with pin 62 to limit vertical movement of the tone arm in either direction about the pivot pin 59.

The arm 15, which has been previously mentioned, is secured to the tone arm supporting spindle 54 near the lower end thereof. As shown in Figs. 1 and 5, the arm 15 is formed so as to provide a pair of parallel U-shaped fingers 64 and 65 which are shaped to receive and embrace the lower portion of spindle 54. These fingers, together with bolt 66, constitute a clamp which secures the arm 15 to the spindle 54. The arm 15 is secured to the spindle 54 so as to extend in predetermined angular relation to the tone arm, as shown in Fig. 1.

The tone arm is actuated by connections extending to the levers 43 and 44, as will now be described. As shown in Fig. 5, a flexible element 67, which may take the form of a cord, has one end fastened to pin 62, at the central portion thereof and extends downward through the hollow standard 57, through the supporting base or panel 1, and through an opening 68 in bracket 51. The bracket 51 has formed therein retaining and guiding portions 69 and 70 in which cord 67 seats. As may be seen in Fig. 5, the cord 67 curves around the heel portion of bracket 51 and is slidably held at that point by the retainer and guide 70. The other end of the cord is fastened to one end of a coil spring 71. A link 72, which may be formed of fairly rigid wire, is connected between the other end of spring 71 and lever 43, as shown in Fig. 1.

A second coil spring 73 (Fig. 5) has one end connected to a projecting finger 74 on arm 15. A link element 75, similar to link 72, is connected between the other end of spring 73 and lever 44, as shown in Fig. 1.

During the playing of a record, the above-described connections are inoperative and the levers 43 and 44 are against a stationary stop 76 (Fig. 1) secured to the supporting base 1. At such time, the tone arm is free to move inwardly over the record as the stylus traverses the sound groove thereof, the above-described connections being relaxed and permitting such free movement of the tone arm. When the cycling cam 17 is actuated at the end of the playing of a record, arm 43 is immediately engaged by a rise 77 (Figs. 1 and 8) on the adjacent cam surface and is rotated clockwise. Consequently, spring 71 (Figs. 1 and 5) is placed under tension and a pull is exerted on cord 67. The arrangement of the cord is such that it exerts a force on the tone arm having both vertical and horizontal components. The vertical force component rotates the tone arm about the horizontal pivot pin 59 to lift the stylus from the record, and the horizontal force component rotates the tone arm outward about its vertical axis of rotation until the tone arm reaches the position indicated by the dot-and-dash line a—a in Fig. 1. When the tone arm is in that position, the vertical portion of cord 67 (see Fig. 5) is exactly parallel to the vertical axis of rotation of the tone arm, i. e. the longitudinal axis of the vertical spindle 54. Such position is a "neutral" position because there is then no horizontal force component exerted on the tone arm by the tensioned spring 71. Moreover, movement of the tone arm horizontally in either direction from the said neutral position will cause a horizontal force component tending to move the tone arm back to the neutral position.

By the time the tone arm reaches the above-mentioned neutral position, the second arm 44 is engaged by a rise 78 (Figs. 1 and 8) on the adjacent cam surface, and spring 73 is placed under tension. This spring exerts a horizontal force which swings the tone arm outward beyond the edge of the record, to permit another record to be dropped, as hereinafter described. At this time, the spring 71 is exerting a horizontal force component tending to swing the tone arm back toward the neutral position above mentioned, but the force exerted by spring 73 predominates.

After a new record has been dropped on the turntable, arm 44 encounters the decline 79 (Fig. 8) and the pull on connector link 75 is released with consequent removal of the tension of spring 73. The horizontal force component of cord 67 due to the tension of spring 71 is now effective to move the tone arm inward. In the meantime, however, the mechanism now to be described is actuated to index or properly position the tone arm for the commencement of playing of the new record.

*The tone arm indexing mechanism*

Figure 12:
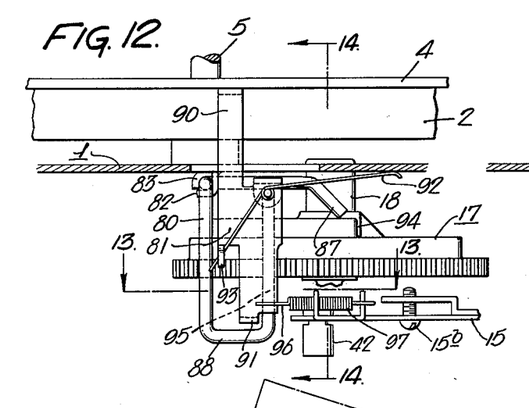
Fig. 12 is a fragmentary sectional view taken along the line 12—12 of Fig. 1.
Figure 14:
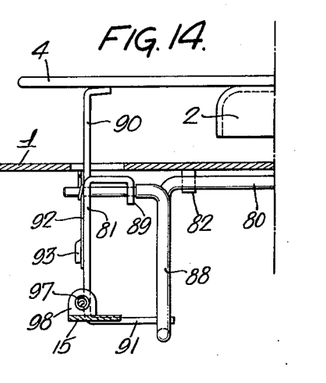
Fig. 14 is a view taken along line 14—14 of Fig. 12.

Reference is made to my copending application Serial No. 704,473, filed October 19, 1946, now Patent Number 2,563,653, wherein there is disclosed and claimed an indexing mechanism of the general character here provided and now to be described. The indexing of the tone arm is effected by a pair of mutually cooperative stop members 80 and 81 which are shown in Figs. 1, 2, 7, 8, 12 and 14. Referring particularly to Figs. 1, 12 and 14, the stop member 80 comprises a rod which is rotatably supported adjacent the underside of the supporting panel 1 by fingers 82 to 86 struck out from the supporting panel. One end of the rod is bent downwardly at 87 to form a finger which engages the upper surface of cam 17. Near its opposite end, the rod 80 is bent to form a U-shaped portion 88 which serves as a stop, as hereinafter described. As shown in Fig. 14, the outer end of the rod carries the stop member 81. The latter is formed of flat metal and it has a bent-out apertured extension 89 through which the end portion of rod 80 extends. Thus member 81 is freely supported by the projecting end of member 80. As shown in Figs. 12 and 14, member 81 has an upwardly extending finger 90, the purpose of which will be described presently. At its lower end, member 81 has an extension 91 which extends between the sides of the U-shaped stop 88. A spring 92 is arranged to urge member 81 to its inoperative position. The spring 92 encircles the end of rod 80 (Fig. 12), and one end of the spring is adapted to engage the underside of panel 1 while the other end of the spring engages a bent-out lug 93 on member 81.

Normally, both of the stop members 80 and 81 are in the positions shown in Fig. 2, the finger 90 is so located that it is engageable by the underside of a 12" record placed on the turntable but is not engageable by a 10" record placed on the turntable. Assuming first that a 10" record has been dropped on the turntable during the record-changing cycle, the depending finger 87 is engaged by an abrupt rise 94 (Fig. 8) on the cam 17 to move the stop member 80 to its operative position, as shown in Fig. 12. However, the stop member 81 is maintained in inoperative position by the spring 92. Under such conditions, the side 95 of the U-shaped stop 88 is effective to position the tone arm for the playing of the 10" record. In the event that a 12" record has been dropped on the turntable, the finger 90 is engaged by the record to move stop member 81 against the force of spring 92 to its operative position, in which the said member is effective to index the tone arm for the playing of the 12" record.

The indexing of the tone arm is effected by the engagement with either of the above-mentioned stop members of a projecting finger 96 carried by arm 15. On the said arm, there is provided a relatively stiff coil spring 97 which is supported by turned-up lugs 98 and 99. A portion of the spring is free and the free end is formed to provide the finger 96. The resilience of the free portion of the spring prevents damage to the parts in the event that the tone arm is manually moved while finger 96 is in engagement with one of the stops. Fig. 13 shows the engagement of finger 96 with either of the stop members, depending upon which one is effective, and it also shows how the finger may be deflected if the tone arm is manually moved.

While the inward movement of the tone arm is being restrained to index it properly, the tone arm is lowered to bring the stylus into engagement with the marginal portion of the record. This is accomplished by engagement of lever 43 with the decline 100 (Figs. 1 and 8) on cam 17 which releases the tension of spring 71 and permits the tone arm to lower under the influence of gravity. The reason for the elongated opening 60 (Fig. 3) may now be understood. This opening permits slight movement of the tone arm independently of its support so as to permit the stylus to follow the lead-in groove of the record while the tone arm support is being restrained by either of the stop members 80 or 81. Near the end of the record-changing cycle, finger 87 rides down an incline 101 (Fig. 11) of cam 17, and the stop members return to their normal inoperative positions. The tone arm is then free to move inward during the playing of the record.

*The record-supporting and feeding mechanism*

Figures 15, 16, 17, 18:
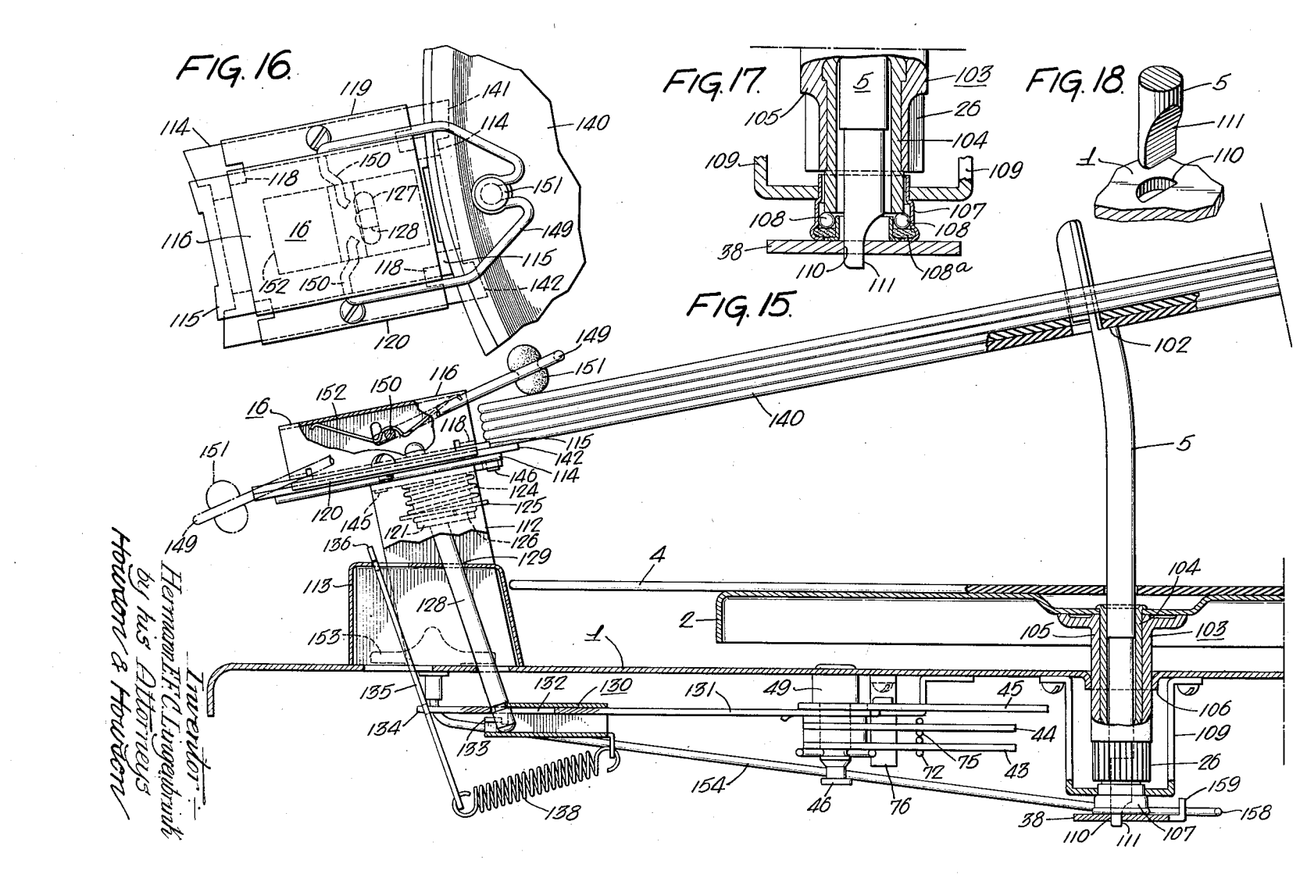
Fig. 15 is a sectional view taken along line 15—15 of Fig. 1.
Fig. 16 is a plan view of the record support and feed mechanism shown in Fig. 15.
Fig. 17 is a sectional view of the mounting for the central spindle.
Fig. 18 is a fragmentary perspective view of certain elements of the said mounting.
Figures 19, 21:
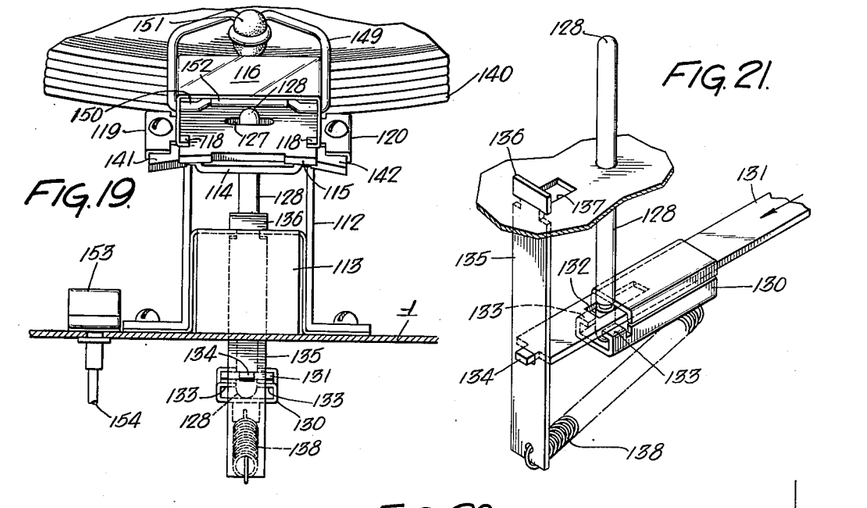
Fig. 19 is an elevational view of the record support and feed mechanism.
Fig. 21 is a fragmentary perspective view of certain parts of said mechanism.

Referring now to Fig. 15, as previously mentioned, a stack of records to be played is supported above the turntable by the central spindle 5 and the record feed mechanism 16. The spindle 5 is formed, as illustrated in Fig. 15, to provide a shoulder 102 for supporting the records adjacent the central apertures therein. As in automatic phonographs of this general type, the lowermost record is moved laterally to free it from the shoulder 102 and cause it to drop onto the turntable or onto whatever other records may already be on the turntable.

The mounting for the turntable and for the spindle 5 is shown in Figs. 15, 17 and 18. The turntable is carried by a two-part tubular assembly 103 comprising an inner sleeve 104 and an outer sleeve 105. These elements extend through the supporting panel 1 which has a supporting flange 106 thereon. As shown in Fig. 17, the inner sleeve 104 extends within a ball bearing 107 and seats on the balls 108 which are supported by a ring 108a. The bearing is supported by plate 38 and also by a yoke 109 which is secured to the supporting panel 1, as may be seen in Fig. 15. The plate 38, which has been previously mentioned, extends beneath bearing 107 and is secured to the yoke 109 and also to the lower end of stud 18. This plate has a semi-circular opening 110 therein (see Fig. 18) and the lower end of spindle 5 is shaped as at 111 to seat within the said opening. The spindle 5 extends within the inner sleeve 104 and is held stationary by virtue of its mounting. The tubular assembly 103 rotates about the lower portion of the spindle as the turntable rotates.

The pinion 26, which serves to drive the cycling cam as previously described, is formed as a part of the rotatable tubular assembly 103. The lower portion of the outer sleeve 105 is formed with teeth thereon thus constituting the pinion 26.

Referring now to the record feed mechanism, as shown in Figs. 15, 16 and 19 to 25, an inverted U-shaped support 112 is mounted on the supporting panel 1, and a hollow box-like member 113 is disposed within member 112 and is also secured to the supporting panel 1. Member 112 serves to support an assembly comprising a base plate 114 (see Fig. 24), a slide 115 and a cover or hood 116. The slide 115 slides on the base plate 114 above a channel 117 thereof and is held by in-turned lugs 118 on hood 116. The hood 116 is secured to the base plate 114 by means of the flanges 119 and 120 on these respective members. The assembly comprising the three members 114, 115 and 116 is held on the U-shaped support 112 by means of a bushing on sleeve 121 (see Fig. 20) which extends through an opening 122 in the base plate 114, the upper end of bushing 121 being flanged at 123. A coil spring 124 surrounds bushing 121 and is held thereon by a washer 125 and split ring 126. By this construction, the assembly comprising members 114, 115 and 116 is rotatably and resiliently held on the top of support 112.

The slide 115, which constitutes the record ejector, has a slot 127 therein (Figs. 19 and 24) to accommodate a pin 128 whose upper end projects through the said slot. The pin 128 extends through the top of box 113 at 129 and also extends through the bushing 121. The pin is supported at its lower end by a box-like slide 130 (Fig. 21) which is slidably carried by a bar 131. The latter is slotted at 132 to accommodate the pin 128. The lower end of the pin rests on the bottom of the box-like slide 130 which has in-turned fingers 133 below bar 131. The end of bar 131 has a tongue 134 which seats in an opening in hanger 135. The latter is freely suspended from the top of box 113 by means of the head portion 136 and the cooperative opening 137. A coil spring 138 is connected between the lower end of hanger 135 and the slide 130, the spring being under tension so as to urge these elements toward one another. This spring has several functions, as will be noted later. The fingers 133 serve as stops to prevent upward movement of the pin-supporting end of slide 131.

Figure 20:
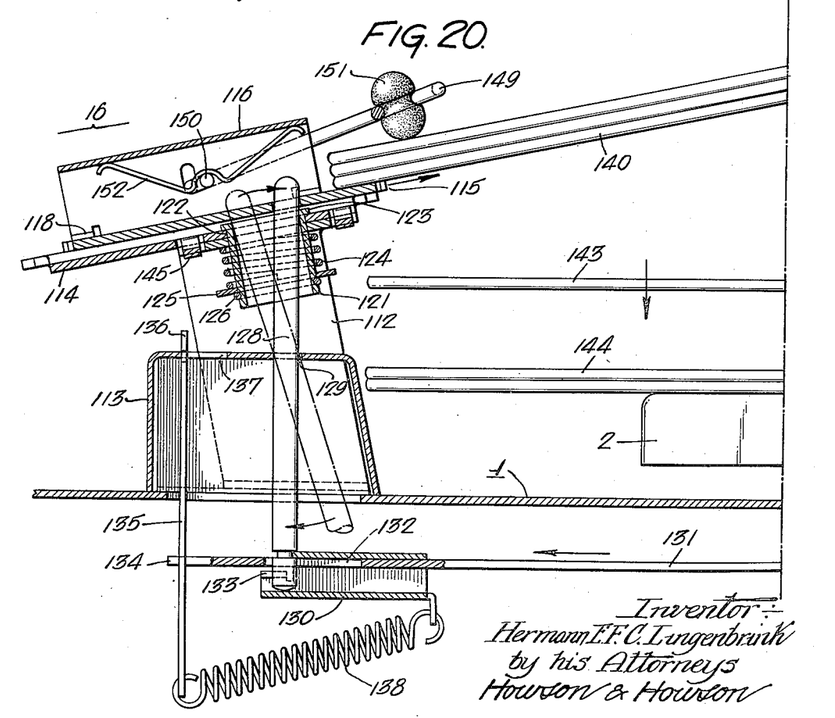
Fig. 20 is a sectional view illustrating the operation of the said mechanism.

The pin 128 is tilted or rocked about point 129, to actuate the record-ejector slide 115, by the bar 131 which is connected to lever 45 at 139, as shown in Fig. 8. Normally, the pin 128 is in the inclined position shown in Fig. 15 and also shown in dot-and-dash outline in Fig. 20. At such time, the lowermost record of the stack 140 rests on the projecting side portions 141 and 142 of plate 114, and the ejector slide 115 aligned with the edge of the record. Referring to Fig. 8, when the cycling cam 17 rotates counter-clockwise during the record-changing cycle, the roller 23 approaches lever 45 and engages the same at a predetermined time in the said cycle. Consequently, a force is exerted on bar 131 in the direction of the arrow in Fig. 20 and the pin 128 is rocked to the solid-line position of Fig. 20, thus moving the slide 115 forward to eject the lowermost record. In Fig. 20, a record is shown at 143 immediately after it has been ejected and while it is dropping toward the uppermost record 144 on the turntable 2. As the cycling cam continues to rotate, the roller 23 passes beyond lever 45 and the parts of the ejecting mechanism return to their normal positions under the influence of spring 138. It will be understood that the ejection and the dropping of the lowermost record of the supported stack takes place at the time during the record-changing cycle when the tone arm is in its outermost position to permit the changing of records.

As mentioned above, the spring 138 serves several purposes. It holds the parts of the ejector mechanism together in their proper relationship; it urges bar 131 toward its normal rest position; and it allows "overrun" of bar 131 during normal operation when pin 128 strikes sleeve 121, or in the event that the record jams and prevents movement of ejector slide 115. The latter is a safety feature which prevents breakage of the record.

Figure 22:
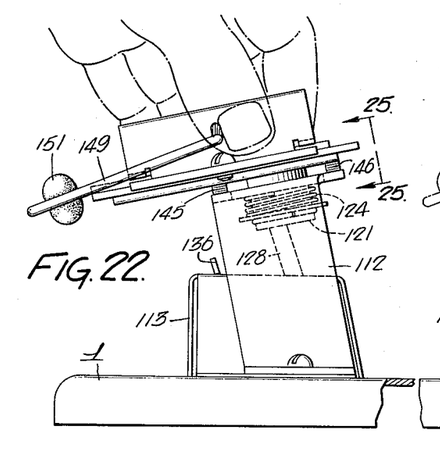
Figs. 22 and 23 illustrate the adjustment of the said mechanism for different sized records.
Figure 23:
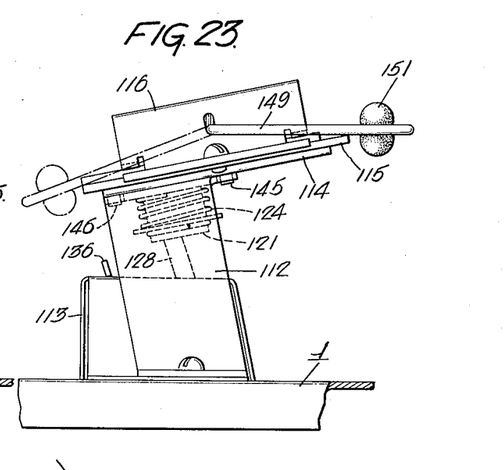
Figures 24, 25:
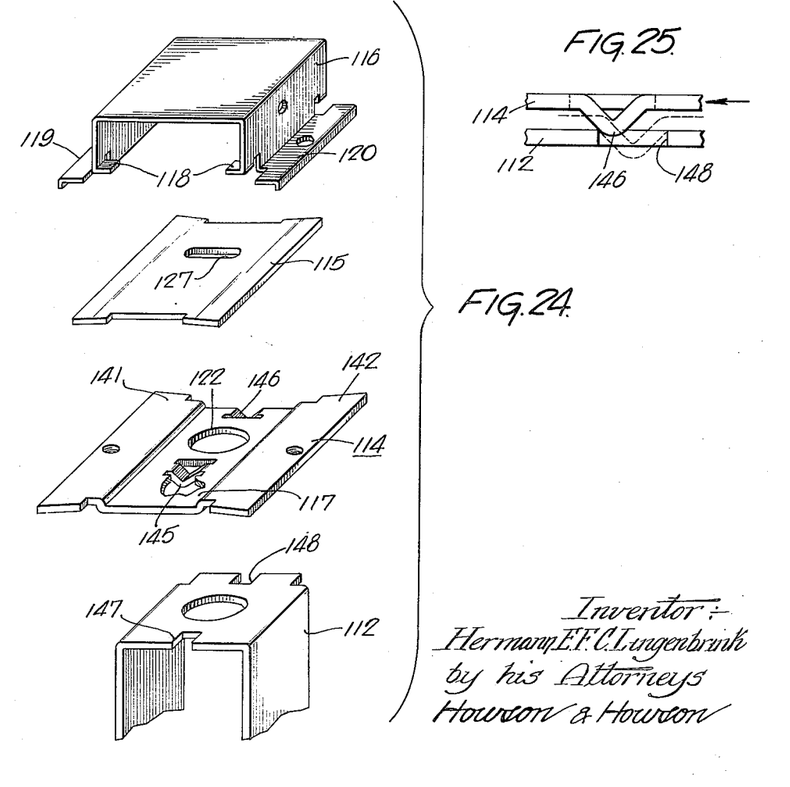
Fig. 24 is an exploded view showing certain parts of the record-supporting device.
Fig. 25 is a detail view taken along line 25—25 of Fig. 22.

In order to adapt the record-ejecting mechanism for 10″ or 12″ records, the ejecting assembly is movable through 180° to two different positions shown, respectively, in Figs. 22 and 23. It will be noted that the opening (Fig. 24) in plate 114 and the slot 127 in slide 115 are offset from the centers of these respective members to adapt the mechanism for the support and ejection of either 10″ or 12″ records. As previously mentioned, the record-supporting and ejecting assembly is resiliently supported on top of the stationary support 112. To change the position of the said assembly, it is merely necessary to grasp it as illustrated in Fig. 22 and turn it through 180°. The said assembly is held in either position by detents 145 and 146 (Fig. 24) on plate 114 which cooperate with recesses 147 and 148 provided in the top of the stationary support 112. When the assembly is rotated, the edges of the said recesses cam the detents upwardly, as may be seen from Fig. 25, causing the movable assembly to rise slightly which is permitted by the resilient mounting thereof.

In order to hold the stack of supported records firmly on the supporting surfaces, there is provided a holder 149 in the form of a bent wire or rod whose ends 150 are turned inwardly and extend within the hood or cover 116. At its free end, the holder 149 carries a resilient member 151 which is adapted to engage the uppermost record. The holder 149 is movable between operative and inoperative positions, as shown in Fig. 15. Within the hood 116, there is provided a flat metal spring 152 which is arranged to maintain the holder 149 in either of its positions.

*The Automatic—Manual—Reject Feature*

The preceding description has been entirely with reference to automatic operation of the phonograph apparatus. There is provided, however, means whereby the automatic operation may be prevented to permit manual operation, and the same means also enables the changing of records at any time during automatic operation. Referring to Fig. 1, there is provided a manually-operable knob 153 which is slidably movable in opposite directions. Connected to the knob, below the supporting panel 1, is an element 154, as shown in Figs. 1, 7, 8, 9 and 15, which is in the form of a stiff wire or rod. This element has two bends or recesses 155 and 156 (Fig. 1), either of which is adapted to engage a groove in the lower part of stud 46, as may be seen in Figs. 7 and 15. Beyond the said recesses, the element 154 has a portion 157 and it also has a U-shaped portion 158 which is supported by plate 38, the latter having an up-turned flange 159 with recesses therein to accommodate said U-shaped portion. At its extreme end, element 154 has a projecting finger 160. When the knob 153 is in the position for automatic operation, the element 154 is positioned as shown in Fig. 1 and is ineffective. When the knob 153 is moved to the manual position, thus bringing recess 155 into engagement with stud 46, portion 157 engages a down-turned lug 161 on member 27 and prevents said member from moving to operative position, thus preventing automatic operation.

Assuming that the knob 153 is positioned for automatic operation, with recess 156 of element 154 in engagement with stud 46, a record-changing cycle may be initiated at any time during the playing of a particular record to reject that record merely by moving the knob 153 slightly forward in the direction of the reject arrow. This brings the finger 160 into engagement with the lug 34 on latch member 33, thereby tripping the latch member and causing a record-changing cycle to take place.

It should be noted that the wire element 154 is so shaped and arranged that it will remain in either the automatic position or the manual position but will not remain in reject position. This is due not only to the provision of the recesses 155 and 156 but also to the tendency of the wire element to snap back to the automatic position when it is pulled forward and then released.

The mechanism under discussion may also be utilized to start automatic operation of the phonograph apparatus from its normal inactive condition, with the tone arm in its rest position on the supporting post 12 as shown in Fig. 1. Such operation will now be described.

Assume that the phonograph apparatus has not been in use, the turntable driving motor being de-energized, and the tone arm being in its rest position. The record supporting and ejecting mechanism 16 is adjusted according to the size of the records to be played, and a stack of records is placed in position above the turntable. The turntable driving motor is then energized (by means of a switch not shown) to start rotation of the turntable. If the knob 153 is not already in automatic position, it is moved forward to bring the recess 156 of the wire element 154 into engagement with stud 46, and the knob 153 is then moved slightly forward as in the case of reject action, as above described. This trips the latch member 33 and causes rotation of the cycling cam 17, as above described. As the cam rotates through a single complete revolution, the record ejecting mechanism is actuated to drop the lowermost record of the supported stack upon turntable, and the tone arm is moved from its rest position and is brought into engagement with the marginal portion of the said record. When the cycling cam has completed its revolution, the playing of the record commences, as hereinbefore described.

The manner in which the tone arm is moved from its rest position may be seen by considering the illustration of Fig. 4 in conjunction with the operating cycle. In its rest position, the tone arm 9 is in the solid-line position of Fig. 4, resting on the support 13 against the cushioning element 14. It should be noted that the end portion of support 13 is bent in the form of a hook 162, and the adjacent side of the tone arm has an aperture 163.

When the wire element 154 is drawn to reject position and the cycling cam 17 commences its rotation, the first thing that takes place is the engagement of the cam rise 77 with the lever 43 to place spring 71 under tension. The spring exerts both vertical and horizontal components of force on the tone arm, and since the tone arm is in its outermost position beyond the "neutral" position a—a (Fig. 1) herein before described, the horizontal component is in a direction to move the tone arm inward or toward the left in Fig. 4. The result is that the tone arm moves to the broken-line position represented at 164, the hook 162 preventing the tone arm from being moved forcefully upward and inward to the neutral position. In the meantime, the cam rise 78 engages lever 44 to place spring 73 under tension, and this spring exerts a horizontal force on the tone arm tending to move it outward. Consequently the tone arm moves toward the right in Fig. 4 against the cushioning element 14, and since it is still under the influence of the vertical force exerted by spring 71, it moves upward above hook 162 to the broken-line position represented at 165. When the lever 44 engages the decline 79 on cam 17, the tension of spring 73 is relaxed and spring 71 is then effective to move the tone arm inward or toward the left in Fig. 4 as represented by the broken-line position 166. The indexing and lowering of the tone arm is effected in the manner hereinbefore described, and the playing of the first record commences. Thereafter the records are played in succession, the record changing cycle taking place automatically as previously described.

The phonograph apparatus provided by this invention has now been fully described. From a commercial standpoint such apparatus is chiefly characterized in that it is composed largely of simple parts which may be economically formed by stamping such parts from sheet metal, and consequently the apparatus is capable of low cost production and may be sold at a relatively low price. It will also be seen, however, that the apparatus embodies various novel features, by virtue of which it is highly efficient and reliable in operation.

While the invention has been disclosed with specific reference to the embodiment illustrated, it will be understood that no limitations or restrictions are intended other than those imposed by the claims.

I claim:

1. In an automatic phonograph of the record dropping type, a turntable arranged to receive records successively dropped thereon, a tone arm mounted for movement about both vertical and horizontal axes of rotation for the playing of records successively, a first pull connection extending to said tone arm to move the same about said axes, said connection having a portion extending upwardly to the tone arm in spaced relation to the vertical axis of rotation of the tone arm, means fixing the lower end of said portion in such relation to the point of connection to the tone arm that said portion is parallel to said vertical axis only when the tone arm is in a predetermined position inwardly of its record-commencing position and outwardly of its record-finishing position, whereby a pull on said connection urges said tone arm toward said predetermined position regardless of whether the tone arm is inwardly or outwardly of said predetermined position, a second pull connection extending to said tone arm to move the same horizontally outward, means operative at the end of the playing of a record to first exert a pull through said first connection and then a stronger pull through said second connection, and to release the pulls in reverse sequence, whereby the tone arm is raised from the played record and is moved outwardly clear of the record to permit dropping of the next record, and the release of the pull through the second connection enables the pull through the first connection to move the tone arm inwardly toward the aforementioned predetermined position, and stop means operative to index the tone arm in its record-commencing position prior to release of the pull through said first connection.

2. An automatic phonograph according to claim 1, wherein said stop means includes a pair of stop members for positioning the tone arm according to different sized records, one of said stop members including an element engageable only by a larger sized record to render such stop member effective.

3. In an automatic phonograph of the record dropping type, a turntable arranged to receive records successively dropped thereon, a tone arm mounted for movement about both vertical and horizontal axes of rotation for the playing of records successively, a first pull connection extending to said tone arm to move the same about said axes, said connection having a portion extending upwardly to the tone arm in spaced relation to the vertical axis of rotation of the tone arm, a fixed guide over which said connection extends and which fixes the lower end of said portion in such relation to the point of connection to the tone arm that said portion is parallel to said vertical axis only when the tone arm is in a predetermined position inwardly of its record-commencing position and outwardly of its record-finishing position, whereby a pull on said connection urges said tone arm toward said predetermined position regardless of whether the tone arm is inwardly or outwardly of said predetermined position, a second pull connection extending to said tone arm to move the same horizontally outward, means including a cycling cam operative at the end of the playing of a record to first exert a pull through said first connection and then a stronger pull through said second connection, and to release the pulls in reverse sequence, whereby the tone arm is raised from the played record and is moved outwardly clear of the record to permit dropping of the next record, and the release of the pull through the second connection enables the pull through the first connection to move the tone arm inwardly toward the aforementioned predetermined position, and normally inoperative stop means rendered operative by said cycling cam to index the tone arm in its record-commencing position prior to release of the pull through said first connection.

4. An automatic phonograph according to claim 3, wherein said stop means includes a pair of stop members for positioning the tone arm according to different sized records, one of said stop members including an element engageable only by a larger sized record to render such stop member effective.

5. In an automatic phonograph of the record dropping type, a turntable arranged to receive records successively dropped thereon, a tone arm mounted for movement about both vertical and horizontal axes of rotation for the playing of records successively, a first pull connection extending to said tone arm to move the same about said axes, said connection having a portion extending upwardly to the tone arm in spaced relation to the vertical axis of rotation of the tone arm, a fixed guide over which said connection extends and which fixes the lower end of said portion in such relation to the point of connection to the tone arm that said portion is parallel to said vertical axis only when the tone arm is in a predetermined position inwardly of its record-commencing position and outwardly of its record-finishing position, whereby a pull on said connection urges said tone arm toward said predetermined position regardless of whether the tone arm is inwardly or outwardly of said predetermined position, a second pull connection extending to said tone arm to move the same horizontally outward, a first coil spring included in said first pull connection, a second stronger coil spring included in said second pull connection, means operative at the end of the playing of a record to first tension said first spring and then said second spring, and to relax the springs in reverse sequence, whereby the tone arm is raised from the played record and is moved outwardly clear of the record to permit dropping of the next record, and the relaxing of the second spring enables the first spring to move the tone arm inwardly toward the aforementioned predetermined position, and stop means operative to index the tone arm in its record-commencing position prior to the relaxing of the first spring.

6. In an automatic phonograph of the record dropping type, a turntable arranged to receive records successively dropped thereon, a tone arm mounted for movement about both vertical and horizontal axes of rotation for the playing of records successively, a first pull connection extending to said tone arm to move the same about said axes, said connection having a portion extending upwardly to the tone arm in spaced relation to the vertical axis of rotation of the tone arm, a fixed guide over which said connection extends and which fixes the lower end of said portion in such relation to the point of connection to the tone arm that said portion is parallel to said vertical axis only when the tone arm is in a predetermined position inwardly of its record-commencing position and outwardly of its record-finishing position, whereby a pull on said connection urges said tone arm toward said predetermined position regardless of whether the tone arm is inwardly or outwardly of said predetermined position, a second pull connection extending to said tone arm to move the same horizontally outward, a first coil spring included in said first pull connection, a second stronger coil spring included in said second pull connection, means including a cycling cam operative at the end of the playing of a record to first tension said first spring and then said second spring, and to relax the springs in reverse sequence, whereby the tone arm is raised from the played record and is moved outwardly clear of the record to permit dropping of the next record, and the relaxing of the second spring enables the first spring to move the tone arm inwardly toward the aforementioned predetermined position, and normally inoperative stop means rendered operative by said cycling cam to index the tone arm in its record-commencing position prior to the relaxing of the first spring.

7. An automatic phonograph according to claim 6, wherein said stop means includes a pair of stop members for positioning the tone arm according to different sized records, one of said stop members including an element engageable only by a larger sized record to render such stop member effective.

8. In an automatic phonograph of the record dropping type, a turntable arranged to receive records successively dropped thereon, a tone arm mounted for movement about both vertical and horizontal axes of rotation for the playing of records successively, a first pull connection extending to said tone arm to move the same about said axes, said connection having a portion extending upwardly to the tone arm in spaced relation to the vertical axis of rotation of the tone arm, a fixed guide over which said connection extends and which fixes the lower end of said portion in such relation to the point of connection to the tone arm that said portion is parallel to said vertical axis only when the tone arm is in a predetermined position inwardly of its record-commencing position and outwardly of its record-finishing position, whereby a pull on said connection urges said tone arm toward said predetermined position regardless of whether the tone arm is inwardly or outwardly of said predetermined position, a second pull connection extending to said tone arm to move the same horizontally outward, a first coil spring included in said first pull connection, a second stronger coil spring included in said second pull connection, a pair of pivoted levers to which said pull connections are respectively attached, a cycling cam engageable with said levers to first tension said first spring and then said second spring, and to relax the springs in the reverse sequence, whereby the tone arm is raised from the played record and is moved outwardly clear of the record to permit dropping of the next record, and the relaxing of the second spring enables the first spring to move the tone arm inwardly toward the aforementioned predetermined position, and normally-inoperative stop means rendered operative by said cycling cam to index the tone arm in its record-commencing position prior to the relaxing of the first spring.

9. An automatic phonograph according to claim 8, wherein said stop means includes a pair of stop members for positioning the tone arm according to different sized records, one of said stop members including an element engageable only by a larger sized record to render such stop member effective.

10. In an automatic phonograph of the record-dropping type, a horizontal supporting base, a bracket secured to said base having a horizontal shelf portion, a vertical spindle rotatably supported by said base and having its lower end seated on said shelf portion, a tone arm support mounted on the upper end of said spindle, a tone arm mounted on said support for movement relative thereto about a horizontal axis, the tone arm being movable about a vertical axis by virtue of the rotatability of said spindle and also being rotatable about a horizontal axis by virtue of its mounting on said support, a first pull connection extending to said tone arm to move the same about said axes, said connection having a vertical portion extending upwardly to the tone arm in spaced relation to the vertical axis of rotation of the tone arm, retaining and guiding means on said bracket serving to fix the lower end of said portion in such relation to the point of connection to the tone arm that said portion is parallel to said vertical axis only when the tone arm is in a predetermined position inwardly of its record-commencing position and outwardly of its record-finishing position, whereby a pull on said connection urges said tone arm toward said predetermined position regardless of whether the tone arm is inwardly or outwardly of said predetermined position, a second pull connection extending to said tone arm to move the same horizontally outward, means operative at the end of the playing of a record to first exert a pull through said first connection and then a stronger pull through said second connection, and to release the pulls in reverse sequence, whereby the tone arm is raised from the played record and is moved outwardly clear of the record to permit dropping of the next record, and the release of the pull through the second connection enables the pull through the first connection to move the tone arm inwardly toward the aforementioned predetermined position, and stop means operative to index the tone arm in its record-commencing position prior to release of the pull through said first connection.

11. In an automatic phonograph of the record-dropping type, a horizontal supporting base, a bracket secured to said base having a horizontal shelf portion, a vertical spindle rotatably supported by said base and having its lower end seated on said shelf portion, a tone arm support mounted on the upper end of said spindle, a tone arm mounted on said support for movement relative thereto about a horizontal axis, the tone arm being movable about a vertical axis by virtue of the rotatability of said spindle and also being rotatable about a horizontal axis by virtue of its mounting on said support, a first pull connection extending to said tone arm to move the same about said axes, said connection having a vertical portion extending upwardly to the tone arm in spaced relation to the vertical axis of rotation of the tone arm, retaining and guiding means on said bracket serving to fix the lower end of said portion in such relation to the point of connection to the tone arm that said portion is parallel to said vertical axis only when the tone arm is in a predetermined position inwardly of its record-commencing position and outwardly of its record-finishing position, whereby a pull on said connection urges said tone arm toward said predetermined position regardless of whether the tone arm is inwardly or outwardly of said predetermined position, a second pull connection extending to said tone arm to move the same horizontally outward, a first coil spring included in said first pull connection, a second stronger coil spring included in said second pull connection, means including a cycling cam operative at the end of the playing of a record to first tension said first spring and then said second spring, and to relax the springs in reverse sequence, whereby the tone arm is raised from the played record and is moved outwardly clear of the record to permit dropping of the next record, and the relaxing of the second spring enables the first spring to move the tone arm inwardly toward the aforementioned predetermined position, and normally inoperative stop means rendered operative by said cycling cam to index the tone arm in its record-commencing position prior to the relaxing of the first spring.

HERMANN E. F. C. LINGENBRINK.

REFERENCES CITED

The following references are of record in the file of this patent:

UNITED STATES PATENTS

| Number | Name | Date |
| --- | --- | --- |
| 1,926,580 | Clark | Sept. 12, 1933 |
| 2,094,255 | Carson | Sept. 28, 1937 |
| 2,176,669 | Guedon | Oct. 17, 1939 |
| 2,239,359 | Banning | Apr. 22, 1941 |
| 2,280,685 | Carson | Apr. 21, 1942 |
| 2,284,305 | Slade | May 26, 1942 |
| 2,286,490 | Knox | June 16, 1942 |
| 2,289,356 | Green | July 14, 1942 |
| 2,294,575 | Schneider | Sept. 1, 1942 |
| 2,307,030 | Erwood | Jan. 5, 1943 |
| 2,307,031 | Erwood | Jan. 5, 1943 |
| 2,328,641 | Glaser | Sept. 7, 1943 |
| 2,330,293 | Knox | Sept. 28, 1943 |
| 2,333,414 | DeTar | Nov. 2, 1943 |
| 2,352,331 | Leline | June 27, 1944 |
| 2,354,899 | Wilbur | Aug. 1, 1944 |
| 2,370,875 | Pressley | Mar. 6, 1945 |
| 2,376,741 | Weaver | May 22, 1945 |
| 2,390,862 | Alexanderson et al. | Dec. 11, 1945 |

FOREIGN PATENTS

| Number | Country | Date |
| --- | --- | --- |
| 182,211 | Great Britain | June 30, 1922 |
| 281,003 | Great Britain | Nov. 23, 1927 |
| 320,516 | Great Britain | Oct. 17, 1929 |